US006686309B1

(12) United States Patent
Didillon et al.

(10) Patent No.: US 6,686,309 B1
(45) Date of Patent: *Feb. 3, 2004

(54) CATALYST FOR TREATING GASOLINE CUTS CONTAINING DIOLEFINS, STYRENIC COMPOUNDS AND POSSIBLY MERCAPTANS

(75) Inventors: Blaise Didillon, Rueil Malmaison (FR); Denis Uzio, Marly le Roi (FR); Charles Cameron, Paris (FR); Christophe Gautreau, Montesson (FR)

(73) Assignee: Institut Francais du Petrole, Rueil-Malmaison (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 09/093,807

(22) Filed: Jun. 9, 1998

(30) Foreign Application Priority Data

Jun. 9, 1997 (FR) .............................. 97 07213

(51) Int. Cl.$^7$ .......................... B01J 23/24; B01J 23/44; B01J 21/04; B01J 21/08; B01J 21/10
(52) U.S. Cl. ...................... 502/313; 502/232; 502/240; 502/258; 502/261; 502/262; 502/305
(58) Field of Search ................. 502/232, 240, 502/258, 261, 262, 305, 313

(56) References Cited

U.S. PATENT DOCUMENTS

| 2,770,578 A | 11/1956 | Haensel |
| 2,926,132 A | 2/1960 | Weikart et al. .............. 208/143 |
| 2,946,829 A | 7/1960 | Likins et al. |
| 3,124,526 A | 3/1964 | Butler et al. ................. 208/264 |
| 3,167,498 A | 1/1965 | Krönig et al. ............... 208/143 |
| 3,182,015 A | 5/1965 | Krönig et al. ............... 208/255 |
| 3,203,891 A | 8/1965 | Holden ........................ 208/216 |
| 3,422,002 A | 1/1969 | Kovach et al. |
| 3,493,492 A | 2/1970 | Sze |
| 3,691,066 A | 9/1972 | Carruthers et al. |
| 3,801,516 A | 4/1974 | Juguin et al. |
| 3,956,105 A | 5/1976 | Conway ..................... 208/111 |
| 4,059,504 A | 11/1977 | Bauer |
| 4,098,683 A | 7/1978 | Conway ..................... 208/216 |
| 4,126,645 A | 11/1978 | Collins |
| 4,472,529 A | 9/1984 | Johnson et al. |
| 5,266,188 A | 11/1993 | Kukes et al. |
| 5,444,033 A | * 8/1995 | Isui et al. .................... 502/314 |
| 5,595,634 A | 1/1997 | Hearn et al. .................. 203/29 |
| 5,650,371 A | * 7/1997 | Culross ....................... 502/305 |
| 5,858,908 A | * 1/1999 | Bogdan et al. ............. 502/227 |

FOREIGN PATENT DOCUMENTS

| DE | 27 36 955 | 3/1978 |
| EP | 0 653 242 A1 | 5/1995 |
| EP | 0 685 552 A1 | 12/1995 |
| GB | 954203 | 4/1964 |
| GB | 1346778 | 2/1974 |
| JP | 55023165 | 2/1980 |

* cited by examiner

Primary Examiner—Elizabeth D. Wood
(74) Attorney, Agent, or Firm—Millen, White, Zelano & Branigan, P.C.

(57) ABSTRACT

A catalyst for selective hydrogenation of unsaturated diolefinic and styrenic compounds in gasolines without hydrogenating the aromatic and mono-olerinic compounds is described. It can also eliminate marcaptans when they are present in these gasolines. The catalyst comprises particulate support on which palladium is deposited, distributed at the periphery of the catalyst particles, and at least one metal selected from molybdenum and tungsten, in the form of at least one oxide.

24 Claims, No Drawings

CATALYST FOR TREATING GASOLINE CUTS CONTAINING DIOLEFINS, STYRENIC COMPOUNDS AND POSSIBLY MERCAPTANS

FIELD OF INVENTION

The present invention relates to a catalyst for selective hydrogenation of diolefinic and styrenic compounds in unsaturated gasolines without hydrogenating the aromatic and mono-olefinic compounds. It can also eliminate marcaptans when they are present in thirst gasolines.

BACKGROUND OF THE INVENTION

Steam cracking gasolines ale known to contain gum precursors such as diolefins, also styrenic compounds (such as styrene itself), mixed with mono-olefinic and aromatic compounds. Upgrading mono-olefinic compounds involves selective hydrogenation of diolefins and styrenic compounds.

Cracking of hydrocarbons to produce olefins produces a liquid fraction with a portion of the compounds having a boiling point corresponding to traditional gasoline cuts: This mixture contains high quantities of aromatic and mono-olefinic compounds, which endow it with good fuel properties and enable it to be upgraded, either in the "gasoline pool" or as a source of aromatic compounds. However, such cracking gasolines contain large quantities of highly reactive compounds such as diolefins, which are guns precursors, and styrenic compounds (in particular styrene). Such gasolines are thus unstable which means that a hydrogenation process must be carried out before they are used. Further, depending on the conversion process, such gasolines can contain non negligible quantities of mercaptans, which must be eliminated in order to obtain "sweetened" gasolines, negative to the Doctor test.

Two main types of catalyst are generally used for hydrogenating diolefins and styrenic compounds: catalysts using noble group VIII metals such as palladium, and those using non noble group VIII metals such as nickel. (In the present description, the periodic table considered is that from the Chemical Abstracts Service (CAS)). However, the second type of catalyst generally has a lower activity and undersired oligomerising properties, which necessitates frequent regeneration and the use of a distillation column after hydrogenation to eliminate the heavy compounds. An example of the use of that type of catalyst is described in U.S. Pat. No. 3,691,066. Catalysts based on noble metals are generally more active than catalysts based on non noble metals.

Regarding mercaptan elimination, catalysts using non noble group VIII metals such as nickel can transform mercaptans into sulphides. However, as indicated above, that type of catalyst generally has oligomerising properties, which necessitates frequent regeneration and the use of a distillation column after hydrogenation to eliminate the heavy compounds Further, such catalysts can only treat feeds containing large quantities of marcaptans such as that found in catalytic cracking gasolines.

In addition, while catalysts based on noble group VIII metals are generally more active than catalysts based on non noble metals for hydrogenating diolefinic and styrenic compounds, they do not always transform mercaptans. Their use thus means that the hydrogenated gasoline must be sweetened, for example using a process as described in our French patent applications FR-A-2 753 717 and FR-A-2 753 718.

It should also be noted that the use of group VIII metal—group VIB metal systems has already been described in the literature, for example by M. Yamada, J. Yasuinaru, M. Houaila, D. Hercules in: "Distribution of Molybdenum Oxidation States in Reduced $Mo/Al_2O_3$ Catalysts. Correlation with Benzene Hydrogenation Activity". J. Phys. Chem., 95, 7037–7042 (1991) or by A. Jimenez-Gonzalez, D. Schmeissr in "electron Spectroscopic Studies of Mo and Pt Modified $\gamma$-$Al_2O_3$ Model Catalyst". J. Catal., 130, 332–346 (1991). These documents, however, relate to total hydrogenation reactions.

A first aim of the present invention is to provide a novel catalyst which can carry out selective hydrogenation of diolefins and styrenic compounds in an unsaturated gasoline cut with improved performance. In this case, the catalyst of the invention has the advantage of achieving diolefins and styrenic compound conversions which are higher than that achieved with a palladium catalyst alone. The catalytic performances of this catalyst are also more stable over time than those of the monometallic system.

A further aim of the present invention is to provide a novel catalyst the use of which on an unsaturated gasoline cut containing diolefins, styrenic compounds and mercaptans enables hydrogenation of the diolefins and styrenic compounds and transformation the mercaptans in a single operation.

SUMMARY OF THE INVENTION

The catalyst of the invention is defined as comprising a particulate support constituted by grains of at least one refractory oxide, on which palladium is deposited, distributed at the periphery of the grains of the support, and at least one metal selected from molybdenum and tungsten, in the form of at least one oxide.

More particulary, the grains of the support are, for example in the form of beads or cylinders (for example cylindrical extrudes); the palladium can then be distributed in a peripheral layer of said grains with a penetration to a depth which does not exceed 80%, for example, of the radius of the beads of cylinders.

In the catalyst of the invention, the palladium content is generally in the range 0.2% to 5% by weight and the molybdenum and/or tungsten content is in the range 0.5% to 5% by weight.

The support is generally selected from refractory oxides such as alumina, silica, silica-aluiminas, magnesia or mixtures thereof. Alumina is the preferred support, mole particularly an alumina with a specific surface area in the range 5 to 200 $m^2/g$, preferably 10 to 110 $m^2/g$, more advantageously 20 to 80 $m^2/g$. The pore volume of the refractory oxide support is, for example, 0.4 to 1 $cm^3/g$.

Regarding the preparation of the catalysts of the invention, the group VIII clement and the group VIB element can be introduced using techniques which are known to the skilled person. As an example, if the group VIII metal is palladium, it can be introduced by impregnating with an aqueous or organic solution of a palladium precursor. This precursor can, for example, be an inorganic compound, for example palladium chloride or palladium nitrate, or an organometallic compound, such as palladium bis $\pi$-allyl or palladium bis-acetylacetonate. The tungsten, as an example of a group VIB element, can be introduced by impregnating the support with fin aqueous or organic solution of a tungsten precursor, for example ammonium metatungstate, ammonium paratungstate, tungsten chloride or carbonylated tungsten compounds. The molybdenum can be introduced by impregnating the support using an aqueous or organic molybdenum precursor, for example ammonium heptamolybdate.

The elements can be introduced using common or separated solutions, The two elements ale preferably introduced separately and advantageously, the compound comprising the group VIB element is introduced prior to introducing the compound comprising the group VIII element.

After introducing the different elements, the catalyst is generally dried at a temperature of 90° C. to 150° C., for example at about 120° C., then calcined at temperatures of generally 150° C. to 700° C.

When the catalytic elements are introduced in a plurality of impregnation steps, the catalyst may undergo different treatments between two impregnation steps, for example drying at a temperature of 90° C. to 150° C., for example at about 120° C., and calcining in air at a temperature of 400° C. to 500° C., for example at about 450° C.

In order that the group VIB metal or metals is in the form of oxides in the catalyst, before use it generally undergoes a treatment in a reducing atmosphere, for example in a stream of hydrogen, at a temperature in the range from ambient temperature to 500° C., more particularly in the range from ambient temperature to 250° C.

The gasoline cut to be treated may have a high diolefin content, corresponding, for example, to a MAV (maleic unhydride value) determined using the UOP 326–82 method, in the range 20 to 100, and styrene contents of up to 5% by weight, for example, these values not being limiting. After hydrogenation, the diolefin content generally results in a MAV of less than 8, preferably less than 4 and more preferably less than 2. The styrene concentration after hydrogenation is generally less than 1% by weight, preferably 0.5% by weight.

Depending on its origin, the gasoline may contain 1 to 600 ppm of sulphur in the form of marcaptans. The process using the catalyst of the invention can transform at least 50% of the mercaptans present to sulphides. This reaction occurs during treatment aimed at hydrogenating the diolefins and/or styrenic compounds.

Treatment of the gasoline cut in the selective hydrogenation process using the catalyst of the invention comprises bringing the cut into contact with the catalyst, generally under pressure and at a temperature in the range 10° C. to 200° C., in the presence of a slight excess of hydrogen with respect to the stoichiometric value to enable hydrogenation of the diolefins and styrenic compounds. The hydrogen and the feed are injected as an upflow or downflow into a reactor, for example a fixed bed reactor, in which the temperature is in the range 10° C. to 200° C. The pressure is generally sufficient to keep more than 80% by weight, preferably more than 95% by weight of the gasoline to be treated in the liquid state at the reactor inlet. The pressure is generally in the range 4 to 50 bar, more advantageously in the range 10 to 50 bar. The hourly space velocity, HSV (defined as the ratio of the volume flow rate of the feed to the volume of catalyst) under these conditions is in the range 1 to $20h^{-1}$, preferably in the range 2 to 10 $h_{-1}$, more preferably in tile range 3 to $10h^{-1}$.

The catalyst of the invention can also be used in processes using different technologies. Thus, for example, the hydrogenation reaction can be carried out in a reactor within a distillation column or in a reactor which is external of and associated with a distillation column as described, for example, in French patent application FR-A-2 752 236.

The complete description of all applications, patents and publications cited above and below and the corresponding French application number 97/07 213 filed on Jun. $9^{th}$ 1997 are incorporated by reference into the present description.

The following non limiting examples illustrate the invention.

EXAMPLE 1 (comparative)

A comparative catalyst A was prepared by impregnating a support with a palladium nitrate solution. The support was in the form of beads 2 mm to 4 mm in diameter. The specific surface area was 30 $m^2/g$ and the pore volume was 0.8 ml/g. After impregnation, the catalyst was dried at 120° C. and calcined at 450° C. The palladium content of comparative catalyst A was 0.35% by weight. In that catalyst, the palladium was distributed at the periphery of the beads.

EXAMPLE 2

A catalyst B was prepared from a support with a specific surface area of 30$m^2/g$ and a pore volume of 0.8ml/g. Tile support was first impregnated with an ammonium metatungstate solution. The support was then dried at 120° C. and calcined at 450° C. Then a palladium nitrate solution was impregnated into the support. Finally, the catalyst was dried at 120° C. and calcined at 450° C.

Catalyst B contained 0.35% by weight of palladium and 1.5% by weight of tungsten. In this catalyst, the palladium was distributed at the periphery of the beads.

EXAMPLE 3 (comparative)

A comparative catalyst C was prepared by impregnating a support with a palladium nitrate solution. The support was in the form of beads 2 mm to 4 mm in diameter. The specific surface area was 65$m^2/g$ and the pore volume was 0.6 ml/g. After impregnation, the catalyst was dried at 120° C. and calcined 450° C.

The palladium content of comparative catalyst C was 0.3% by weight. The palladium in that catalyst was distributed at the periphery of the beads.

EXAMPLE 4

A catalyst D was prepared using the same support as that used in Example 3. The support was first impregnated with an ammonium heptamolybdate solution. The support was then dried at 120° C. and calcined at 450° C. Then a palladium nitrate solution was impregnated into the support. Finally, the catalyst was dried at 120° C. and calcined at 450° C.

Catalyst D contained 0.3% by weight of palladium and 1.0% by weight of molybdenum. The palladium in this catalyst was distributed at the periphery of the beads.

EXAMPLE 5

A catalyst E was prepared using the same support as that used in Example 3. The support was first impregnated with an ammonium metatungstate solution, The support was then dried at 120° C. and calcined at 450° C. Then a palladium nitrate solution was impregnated into the support. Finally, the catalyst was dried at 120° C. and calcined at 450° C., Catalyst E contained 0.3% by weight of palladium and 3,0% by weight of tungsten. In this catalyst, the palladium was distributed at the periphery of the beads.

EXAMPLE 6

The hydrogenating properties of catalysts A and B were evaluated by means of a batch test in a perfectly stirred reactor, For each test, 2 g of catalyst was reduced for 2 hours at 150° C. in a stream of hydrogen, then transferred to the hydrogenation reactor under inert gas. The feed to be hydrogenated was a mixture containing 12 g of diolefin diluted in 180 cm$^3$ of n-heptane. The test temperature was kept at 20° C. and the pressure to 10 bar. The results are shown in Table 1. The hydrogenating activity is expressed in mol.min$^{-1}$. g$_{cat}^{-1}$.

TABLE 1

| Catalyst | A | B |
|---|---|---|
| Activity (mol.min$^{-1}$.g$_{cat}^{-1}$) | 1.64 E-02 | 1.85 E-02 |
| 1-butene selectivity at 80% butadiene conversion | 57 | 57 |

It can be seen that the activity of catalyst B of the invention is 1.13 times higher than that of comparative catalyst A, with catalyst B retaining a high 1-butene selectivity.

EXAMPLE 7

The hydrogenating properties of catalysts A and B were evaluated in a traversed bed isothermal reactor.

In each test, 20 cm$^3$ or catalyst was placed in the hydrogenating reactor and reduced for 4 hours at 150° C. at a pressure of 5 bar and a flow rate of 30 l/h of hydrogen. After reducing the catalyst, the pressure was raised to 30 bar and the temperature to 70° C. The feed to be hydrogenated was a model feed composed of 10% by weight of styrene, 10% by weight of isoprene in n-heptane and 300 ppm of sulphur in the form of pentanethiol. The feed was injected at a HSV of 3 h$^{-1}$ in the presence of hydrogen (H$_2$/olefin ratio of 15). The test duration was 6 hours.

Liquid samples were removed and analysed by gas chromatography.

Those analyses were used to determine the styrene and isoprene conversion. The conversion is expressed as the ratio:

[concentration$_{inlet}$-concentration$_{outlet}$)/(concentration$_{inlet}$)]

The results obtained under these conditions are shown in Table 2.

TABLE 2

| Catalyst | Styrene conversion (%) | Isoprene conversion (%) |
|---|---|---|
| A | 54 | 83 |
| B | 83 | 90 |

EXAMPLE 8

A second series of tests using a traversed bed isothermal reactor was carried out on a steam cracking feed using catalysts B and A under the following conditions:

In each test, 12.5 cm$^3$ of base catalyst was placed in the hydrogenating reactor and reduced for 2 hours at 150° C. at a pressure of 5 bar and a flow rate of 27 l/h of hydrogen. After reducing the catalyst, the pressure was raised to 30 bar and the temperature to 70° C. The feed to be hydrogenated was a steam cracking gasoline cut (end point 200° C., sulphur content: 50 ppm; MAV: 68 mg/g; and styrene content: 4% by weight), The feed was injected at an HSV of 8 h$^{-1}$ in the presence of hydrogen (hydrogen flow rate 16.5 l/h). The results shown in Table 3 show the relative rate constants for styrene hydrogenation and diolefin hydrogenation as well as MAV values after 200 hours operation.

The rate constants were determined by assuming that the hydrogenation reactions were first order. They were thus proportional to the logarithm of the ratio between the concentrations at the inlet and outlet of the catalyst bed of the product considered.

TABLE 3

| Catalyst | Relative rate constant for styrene hydrogenation (h$^{-1}$) | Relative rate constant for diolefin hydrogenation (h$^{-1}$) | MAV inlet mg/g | MAV outlet mg/g |
|---|---|---|---|---|
| A | 0.14 | 0.40 | 68 | 22.0 |
| B | 0.25 | 0.64 | 68 | 15.8 |

It can be seen that catalyst B, which contained 1.5% by weight of tungsten, was 1.8 times more active for styrene hydrogenation and 1.6 times more active for diolefin hydrogenation than comparative catalyst A.

EXAMPLE 9

The hydrogenating and sweetening properties of catalysts C, D and E were evaluated in a traversed bed isothermal reactor.

In each test, 20 g of catalyst was placed in the hydrogenating reactor and reduced for 2 hours at 150° C. at a pressure of 30 bar and a flow rate of 50 l/h of hydrogen, After reducing the catalyst, the pressure was raised to 35 bar and the temperature to 100° C. The feed to be hydrogenated was a model feed composed of 10.3% by weight of styrene, 10.3% by weight of isoprene and 522 ppm of sulphur in the form of chanethiol in toluene. The feed was injected at a HSV of 1.4 h$^{-1}$ in the presence of hydrogen (H$_2$/olefin ratio 3,4), Liquid samples were removed and analysed by gas chromatography, The styrene and isoprene conversions were determined from the analytical results.

Analysis of the sulphur content in the effluent after hydrogenation and the mercaptan content in the starting cut enabled the mercaptan conversion to be determined. The conversions are expressed as the ratio:

[concentration$_{inlet}$-concentration$_{outlet}$)/(concentration$_{inlet}$)]

The results obtained under these conditions are shown in Table 4, obtained after stabilisation (200 hours of operation).

TABLE 4

| Catalyst | Styrene conversion (%) | Isoprene conversion (%) | Mercaptan conversion (%) |
|---|---|---|---|
| C | 98.0 | 98.8 | 59 |
| D | 98.8 | 99.4 | 72 |
| E | 99.6 | 99.8 | 80 |

At high conversion, catalysts D and E performed better than comparative catalyst C, both for styrene and isoprene hydrogenation and for mercaptan conversion.

EXAMPLE 10

A second series of tests was carried out with catalysts C, D and E under the following conditions:

In each test, 20 g of base catalyst was placed in the hydrogenating reactor and reduced for 2 hours at 150° C. at a pressure of 30 bar and a flow rate of 50 l/h of hydrogen. After reducing the catalyst, the pressure was raised to 30 bar and the temperature to 90° C., The feed to be hydrogenated was a model feed composed of 10% by weight of styrene, 10% by weight of isoprene and 250 ppm of sulphur in the form of pentanethiol in n-heptane. The feed was injected at a HSV of 3 h$^{-1}$ in the presence of hydrogen (H$_2$/olefin ratio 3.4). The results shown in Table 5 show the isoprene and styrene conversions and mercaptan conversion after 200 hours of operation.

TABLE 5

| Catalyst | Styrene conversion (%) | Isoprene conversion (%) | Mercaptan conversion (%) |
|---|---|---|---|
| C | 47 | 58 | 56 |
| D | 70 | 82 | 78 |
| E | 83 | 90 | 90 |

At lower conversion, the gain made by adding molybdenum or tungsten for hydrogenating unsaturated compounds (styrene and isoprene) and for mercaptan elimination is more marked than in Example 9 above, The preceding examples could be repeated to obtain analogous results by substituting the general or particular reactants and/or conditions described in the invention for those used in the Examples.

In view of the preceding description, the skilled person could readily determine the essential characteristics of the invention and could make various changes or modifications to adapt it to a variety of uses and conditions of use without departing from the spirit and scope of the invention.

What is claimed is:

1. A selective hydrogenation catalyst, comprising a particulate support constituted by grains of at least one refractory oxide, on which a catalytic quantity of palladium is deposited, distributed at the periphery of the grains of the support, and a catalytic quantity of at least one metal selected from molybdenum and tungsten, in the form of at least one oxide.

2. A catalyst according to claim 1, wherein the palladium content is generally in the range 0.2% to 5% by weight and the molybdenum and/or tungsten content is in the range 0.5% to 5% by weight.

3. A catalyst according to claim 1, wherein said support is selected from alumina, silica, silica-aluminas, magnesia and mixtures thereof.

4. A catalyst according to claim 3, wherein said support is an alumina with a specific surface area in the range 5 to 200 m$^2$/g and a pore volume of 0.4 to 1 cm$^3$/g.

5. A catalyst according to claim 4, wherein said support is an alumina with a specific surface area in the range 10 to 110 m$^2$/g.

6. A process for preparing a catalyst according to claim 1, comprising impregnating the support with at least one aqueous or organic solution of at least one palladium precursor comprising at least one inorganic or organometallic compound to introduce palladium and with at least an aqueous or organic solution of at least one of tungsten and molybdenum precursors to introduce at least one of tungsten and molybdenum.

7. A preparation process according to claim 6, wherein the palladium precursor is palladium chloride, palladium nitrate, palladium bis π-allyl or palladium bis-acetylacetonate, the tungsten precursor is ammonium metatungstate, ammonium paratungstate, tungsten chloride or a carbonylated tungsten compound, and the molybdenum precursor is ammonium heptamolybdate.

8. A preparation process according to claim 6, wherein the palladium and the metal selected from tungsten and molybdenum are introduced by means of a common solution.

9. A preparation process according to claim 6, wherein the palladium and the metal selected from tungsten and molybdenum are introduced by means of separate solutions.

10. A preparation process according to claim 6, wherein the compound comprising the metal selected from tungsten and molybdenum is introduced prior to introducing the compound comprising palladium.

11. A preparation process according to claim 6, wherein after introducing the different elements, the catalyst is dried at about 120° C., then calcined to a temperature of 150° C. to 700° C.

12. A preparation process according to claim 6, wherein the metals are introduced by conducting at least two successive impregnation steps, and the catalyst is dried at a temperature of 90° C. to 150° C. and calcined in air at a temperature of 400° C. to 500° C. between the two successive impregnation steps.

13. A preparation process according to claim 6, wherein before use, the catalyst undergoes a treatment in a reducing atmosphere, at a temperature in the range from ambient temperature to 500° C.

14. A preparation process according to claim 13, wherein the temperature is in the range from ambient temperature to 250° C.

15. A catalyst according to claim 1, wherein said support is an alumina with a specific surface area in the range 10 to 110 m$^2$/g.

16. A catalyst according to claim 2, wherein said support is an alumina with a specific surface area in the range 10 to 110 m$^2$/g.

17. A catalyst produced by the process of claim 6.

18. A catalyst produced by the process of claim 12.

19. A catalyst according to claim 1, wherein the content of palladium does not exceed 0.35% by weight.

20. A catalyst according to claim 19, wherein said at least one metal comprises molybdenum.

21. A catalyst according to claim 19, wherein said at least one metal comprises tungsten.

22. A catalyst according to claim 1, comprising 0.35% by weight of palladium and 1.5% by weight of tungsten.

23. A catalyst according to claim 1, containing 0.3% by weight of palladium and 3.0% by weight of tungsten.

24. A catalyst according to claim 1, containing 0.3% by weight, of palladium and 1.0% by weight of molybdenum.

* * * * *